Aug. 13, 1968  R. W. NORDIN  3,396,457
METHOD OF MAKING AN ELECTRODE STRUCTURE
Filed Dec. 2, 1965  4 Sheets-Sheet 1

INVENTOR
ROBERT W. NORDIN
BY William G. Dossé
ATTORNEY

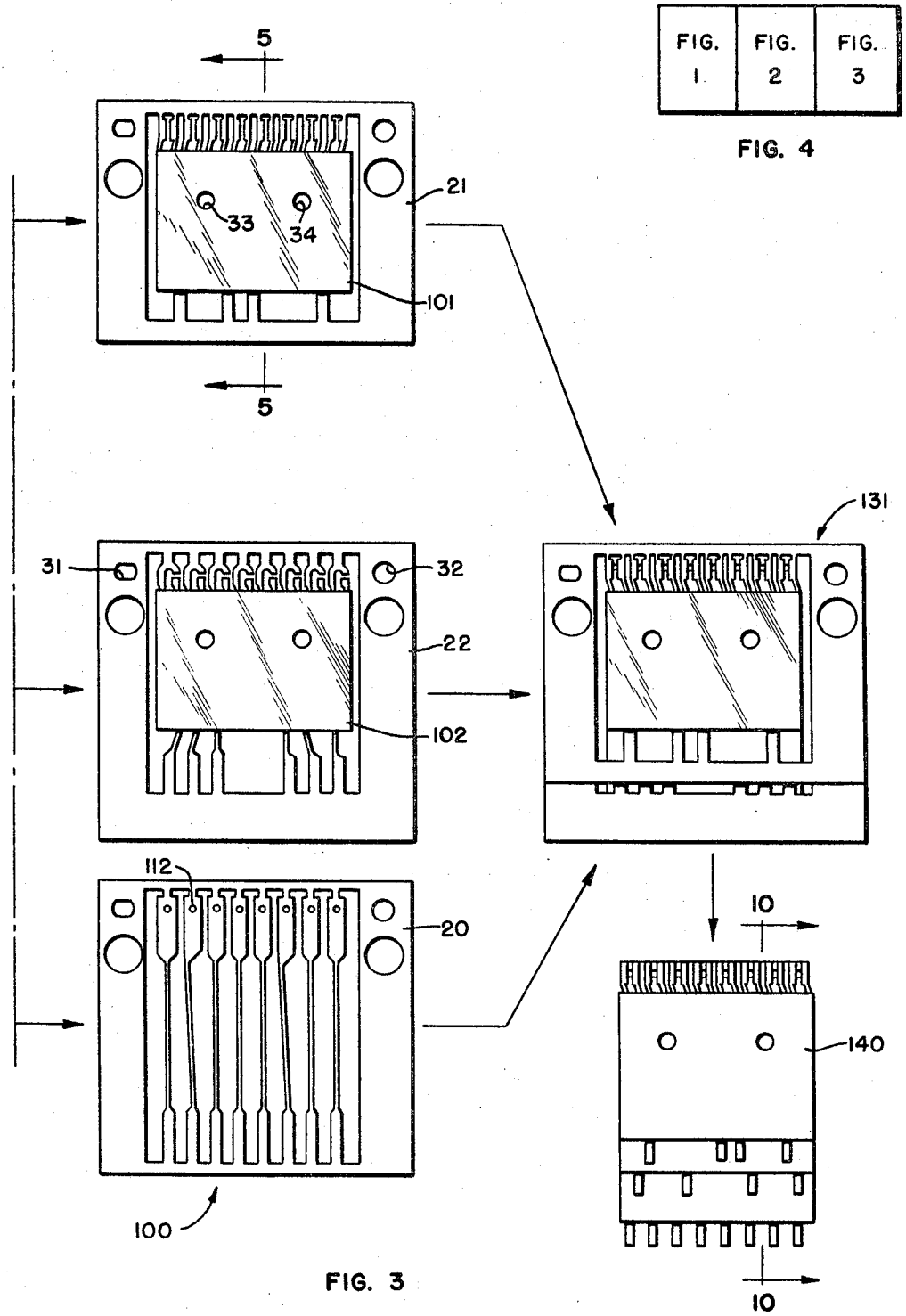

Aug. 13, 1968  R. W. NORDIN  3,396,457
METHOD OF MAKING AN ELECTRODE STRUCTURE
Filed Dec. 2, 1965  4 Sheets-Sheet 4
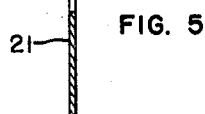
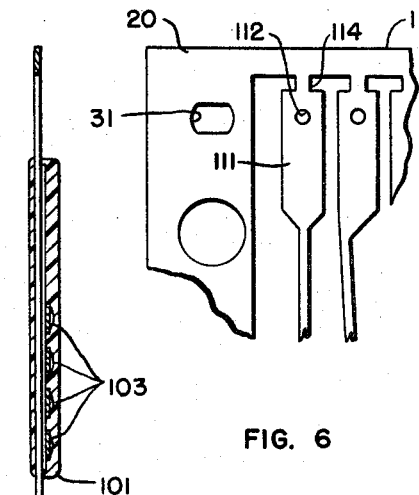
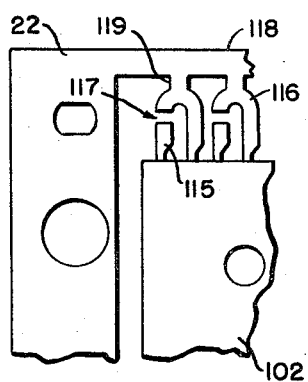
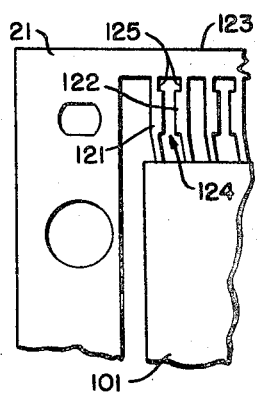
FIG. 5   FIG. 6   FIG. 7   FIG. 8
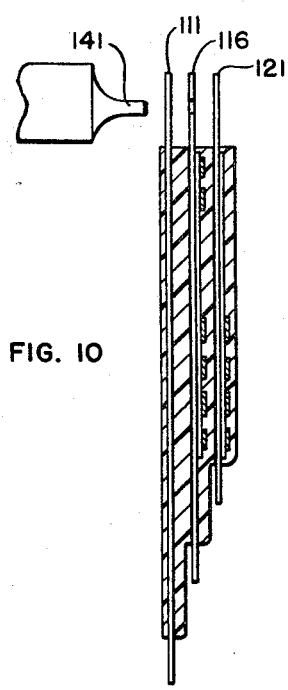
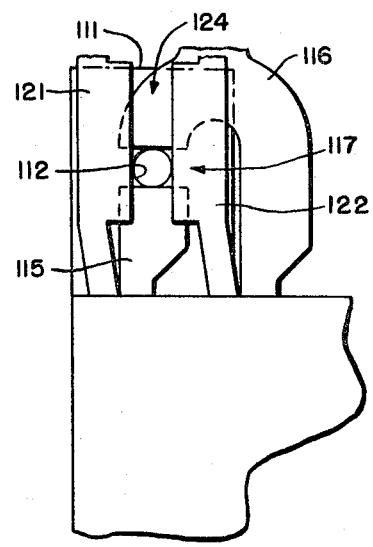
FIG. 10   FIG. 9

3,396,457
METHOD OF MAKING AN ELECTRODE
STRUCTURE
Robert W. Nordin, Skokie, Ill., assignor to Teletype Corporation, Skokie, Ill., a corporation of Delaware
Filed Dec. 2, 1965, Ser. No. 511,085
2 Claims. (Cl. 29—592)

ABSTRACT OF THE DISCLOSURE

An electrode structure is formed by etching a plate of the electrode material to form the desired electrode shapes but with the electrodes still connected to the outer edges of the plate to form a temporary support; making electrical strapping connections between selected electrodes; potting with epoxy the portions of the electrodes which are to be unexposed; and severing the electrodes from the temporary support.

---

United States Patent No. 3,060,429, granted to C. R. Winston on Oct. 23, 1962, discloses an ink-transfer device for electrostatically deflecting ink droplets as they are accelerated from a nozzle toward a piece of paper or other record medium, in order to form visible images of characters on the paper. This deflection phenomenon is similar to that experienced in a cathode-ray tube. In order to print across a full page-width of paper, a plurality of these ink-transfer devices are arranged in a row facing the paper. Each device includes a nozzle from which droplets of ink issue, a valving electrode for turning the flow of ink on and off, a pair of vertical deflection electrodes, and a pair of horizontal deflection electrodes. Electrical potentials are applied to the nozzle and to these several electrodes to control the flow of ink and to control the direction of travel of the stream of ink droplets in order to cause the stream of ink to trace the desired character on the paper. In arranging a plurality of these devices across the width of a page, the configurations and supporting structures of the several electrodes of each ink-transfer device are of small size and are insulated to withstand the electrical potentials which are applied to these electrodes in order to control the charged droplets of ink.

Therefore, it is an object of the present invention to provide a method of forming small, accurately-shaped, insulated electrodes.

It is another object of the present invention to provide a method of forming an assembly of accurately-shaped, interconnected, electrode structures partly surrounded by insulating material.

According to the preferred embodiment of the invention as applied to the manufacture of deflection and valving electrodes for ink-transfer devices, a metallic workpiece having locating indicia thereon for accurate positioning is coated with an etch-resistant material in the shape of the desired electrodes with the edges of the workpiece also protected to provide a peripheral framework for supporting the electrodes. The workpiece is etched to separate the conductors of the electrodes from one another but not from the framework. After making the necessary interconnections between the electrodes, the area of interconnections is filled with a casting epoxy to impart structural rigidity and insulation to the electrodes and interconnections. Accurately-formed holes and gaps are then punched in the valving electrodes and between the pairs of deflection electrodes. Three groups of electrodes are thus formed in separate subassemblies and are molded together to form a single electrode package. The peripheral framework that had been used to support the electrodes is removed since this support of the electrodes is no longer necessary once the molding material has solidified. The electrode package is then mounted on the ink-transfer printing device in front of the nozzles from which the ink droplets issue.

A more complete understanding of the invention may be had from the following detailed description when considered in conjunction with the accompanying drawings wherein:

FIGS. 1, 2 and 3 when arranged as shown in FIG. 4, comprise a flow diagram of the production process by which an assembly of partly-exposed and partly-insulated electrodes is made;

FIG. 5 is a cross-section of one of the electrode subassemblies at an intermediate point in the process taken along line 5—5 of FIG. 3;

FIGS. 6, 7 and 8 are enlarged views of the three different electrode shapes as they appear at a point late in the production process;

FIG. 9 is a greatly enlarged view of all three electrode shapes in their final, assembled positions; and FIG. 10 is an enlarged cross-section of the final assembly taken along line 10—10 of FIG. 3 and that is greatly enlarged in the horizontal direction.

Figure 1:
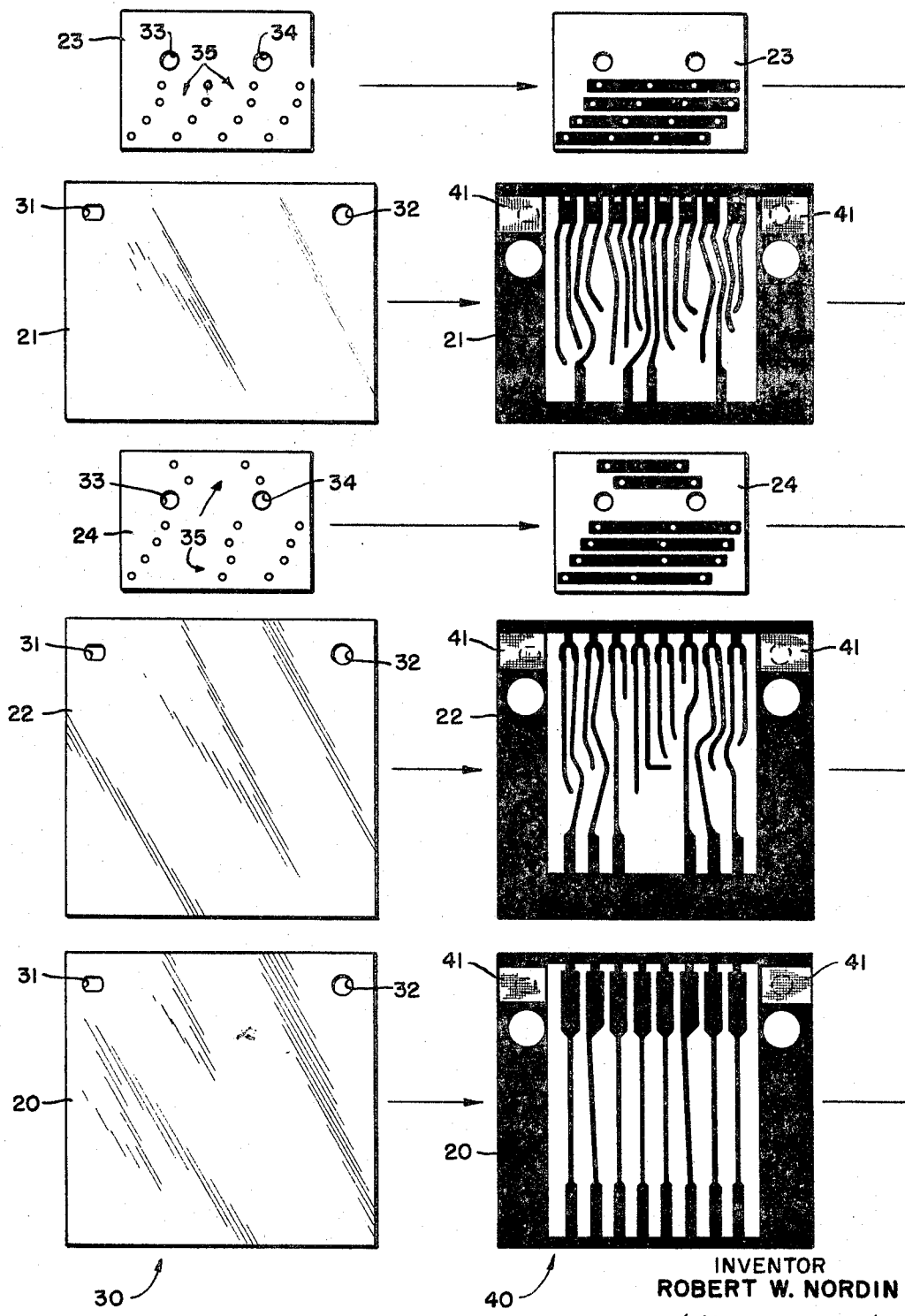
Figure 2:
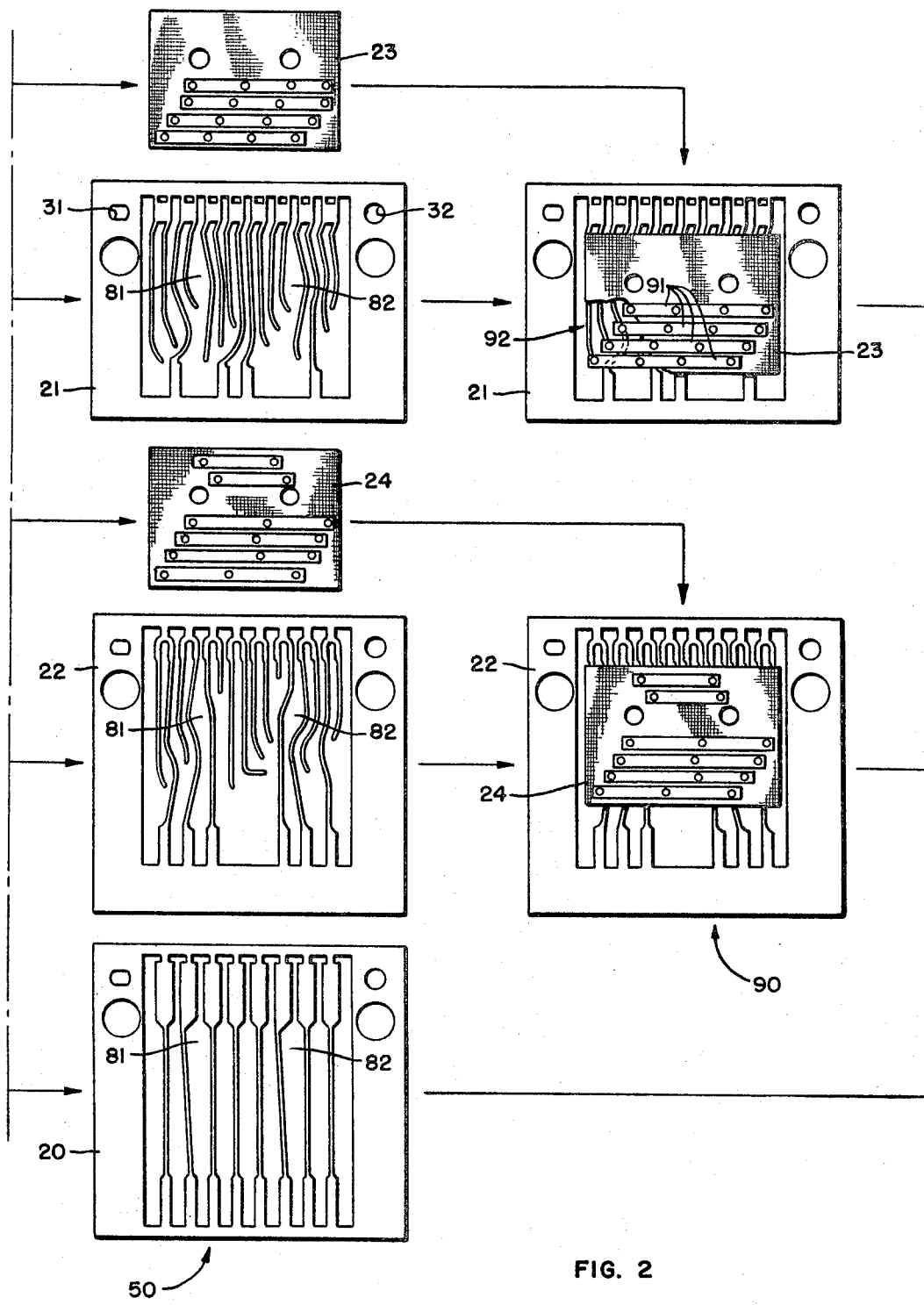

Referring now to the drawings wherein like reference numbers designate the same parts throughout the several process steps and views and referring more particularly to the left side of FIG. 1, there are shown five workpieces cut to the proper size to begin the process of manufacture of the complete electrode assembly. The bottom workpiece 20 is a single sheet of beryllium-copper alloy approximately .010″ thick that is to be made into a number of valving electrodes of the ink-transfer device disclosed in the above-mentioned patent to C. R. Winston. Two other workpieces 21 and 22 are identical with the bottom workpiece 20 and are to be made into a like number of sets of horizontal deflection electrodes and vertical deflection electrodes, respectively, for the ink-transfer device. The two smaller workpieces 23 and 24 are copper-clad, epoxy-glass laminates, approximately .010″ thick, which are to be made into printed strapping wiring to form the necessary electrical interconnections between the individual horizontal and vertical deflection electrodes. The printed strapping wiring to be formed on these workpieces 23 and 24 is formed by prior-art, printed-wiring techniques.

In the first operation—shown as step 30—of the production process, two locating holes 31 and 32 are formed in each beryllium-copper workpiece 20, 21 and 22. These locating holes are used to properly align the workpieces with fixtures during production and with each other in the final stages of assembly. Locating holes 33 and 34 are similarly punched in the strapping workpieces 23 and 24 along with several wiring holes 35 for making connections through the insulating substrates of workpieces 23 and 24.

After the locating and wiring holes 31, 32, 33, 34 and 35 have been punched in all of the workpieces, the valving-electrode workpiece 20 and the two strapping-wiring workpieces 23 and 24 are coated in step 40 with an etch-resistant material or resist in a silk-screen printing process. The areas of metal which are to be removed are not coated with resist but are left bare for removal in an etching process, and the areas to be retained are covered with resist. The silk-screen printing fixture is accurately located on each workpiece by means of the locating holes 31, 32, 33, and 34 which were punched in the workpiece in step 30. The resist pattern is therefore accurately located with respect to these locating holes to provide a proper registry of electrode and strap-wiring locations when the finished electrodes are assembled.

Since the horizontal and vertical deflection electrodes form a more intricate pattern than is customarily made by the silk-screen process, workpieces 21 and 22 are coated with an emulsion of photo-sensitive, etch-resistant material or photo-resist. The photo-resist-coated deflection electrode workpieces 21 and 22 are covered with masks that are accurately positioned on each workpiece by means of locating holes 31 and 32 and carry opaque images of the horizontal and vertical electrode sets and an opaque border on a transparent base. The masked workpieces are then subjected to illumination to expose the areas of the photo-resist coating of each workpiece that are not covered by an opaque image. After the masks have been removed from workpieces 20 and 21, the photo-resist material is developed to remove the emulsion in the exposed areas of the workpieces.

The valving electrode workpiece 20 and the horizontal and vertical deflection-electrode workpieces 21 and 22 all carry a resist pattern that includes a wide border around the edges of the pattern. The resist patterns in the shape of the electrodes are connected to these borders to provide the electrodes with a mechanical support after they have been shaped in the etching process. Since the resist coating of each of these three larger workpieces 20, 21 and 22 does not coat the inside of the locating holes 31 and 32, these holes are covered with a simple masking tape 41 to prevent the etching process from enlarging and thus destroying the holes. The strapping workpieces 23 and 24 are made from a base of glass cloth and epoxy which is resistant to most etching reagents; therefore, locating holes 33 and 34 are not taped. All five workpieces are etched in step 50 to remove all metal that is unprotected by resist or masking tape.

After the etching process has been completed, the tape and resist coatings are removed from all of the workpieces to leave bare all of those areas of metal that were not etched.

The electrodes formed in the horizontal electrode workpiece 21 and the vertical electrode workpiece 22 contain curvatures that outline two openings 81 and 82 in the center of each electrode set. These openings accommodate the locating holes 33 and 34 in strapping workpieces 23 and 24 which are to be assembled to the horizontal and vertical deflection electrode workpieces 21 and 22 in production step 90. Locating holes 31 and 32 and locating holes 33 and 34 are used to locate the strapping conductors 91 on strapping workpieces 23 and 24 with respect to their proper electrodes 92 on the horizontal and vertical deflection electrode workpieces 21 and 22 as shown in a cutaway portion of the insulating substrate of workpiece 23. Electrical connections are then soldered between the horizontal deflection workpiece 21 and its strapping connection workpiece 23 through wiring holes 35 to form a horizontal deflection electrode assembly. Similarly, the cross connections between vertical deflection workpiece 22 and its strapping workpiece 24 are soldered together to form a vertical deflection electrode assembly.

Excess solder is removed from the assemblies 21 and 22 and the cross connections are potted with an epoxy casting material in step 100. The epoxy casting material 101 and 102 is molded into only the central area of the assemblies 21 and 22 to cover and thus insulate the cross connections between strapping workpieces 23 and 24 and workpieces 21 and 22 and the solder beads 103 (FIG. 5) from soldering. The locating holes 33 and 34 are not filled with epoxy but are kept open to form mounting holes for the final electrode assembly.

In production step 100, accurately-placed holes are punched in each valving electrode and accurately-placed slots are punched between each pair of deflection electrodes.

A typical valving electrode 111 is shown enlarged in FIG. 6 with a hole 112 punched in the center of the electrode 111. Hole 112 is accurately positioned in the center of electrode 111 by locating holes 31 and 32. The top 114 of the valving electrode 111 is shown connected to the upper border 113 of the workpiece 20 to properly support the valving electrode 111 in this intermediate stage of manufacture. A pair of vertical deflection electrodes 115 and 116 is shown in FIG. 7 emerging from the epoxy potting material 102. A slot 117 is punched in step 100, separating the electrodes 115 and 116 which are originally made in one piece as shown in step 50. A connection 119 holds electrode 116 to the upper border 118 of the vertical deflection electrode workpiece 22. The horizontal deflection electrodes 121 and 122 are shown in FIG. 8 emerging from potting epoxy 101 and are connected at their upper ends 125 to upper border 123 of horizontal electrode workpiece 21. A gap 124 is punched in step 100 between them to accurately separate them.

After all three electrode sets 20, 21 and 22 have been punched, they are placed together in a transfer mold and properly positioned by their locating holes 31 and 32. The mold is filled with a phenolic molding material to form the final assembly 131 (FIG. 3). Final assembly 131 is then removed from the mold and the borders 113, 118 and 123 are removed by electrical discharge machining since their support of the electrodes is no longer necessary once the phenolic molding material has been hardened in place to hold the electrodes together. The final electrode package 140 is then ready to be assembled in front of a plurality of nozzles like the one shown in the above-mentioned patent to C. R. Winston.

In a specific embodiment of an assembly of electrodes made in accordance with the method herein described, there are eight valving electrodes and a corresponding number of horizontal and vertical deflection electrode sets. These make up into a unit of convenient size, from the standpoint of fabrication, and ten units may be mounted in a row to provide eighty printing positions for an eighty-character line across a page.

FIG. 9 shows a single electrode set with the valving electrode 111 in the rear, the vertical deflection electrodes 115 and 116 immediately in front of the valving electrode, and with the horizontal deflection electrodes 121 and 122 immediately in front of the vertical deflection electrodes. The locating holes 31 and 32 assure that the valving electrode hole 112 is located so that its center is in the middle of the vertical deflection gap 117 and also in the middle of the horizontal deflection gap 124.

FIG. 10 shows how this electrode assembly is positioned directly in front of a nozzle 141 of the above-mentioned Winston patent from which droplets of ink issue and pass directly through the valving hole 112, the vertical gap 117 and the horizontal gap 124 without touching any of these five electrodes.

Although a particular embodiment of the invention is shown in the drawings and described in the foregoing specification it will be understood that the invention is not limited to that specific embodiment, but is capable of modification and rearrangement, and substitution of parts and elements without departing from the scope of the invention.

I claim:
1. A method of making an electrode assemblage from electrically conductive, etchable workpieces comprising the steps of:
   placing locating holes in a plurality of said workpieces, the holes in each workpiece corresponding to similar holes in the other workpieces;
   coating the workpieces in areas determined by the locating holes with at least enough etch resistant material to form the shape of electrodes thereon;
   masking the locating holes with etch resistant material;
   etching the workpieces in the uncoated areas leaving workpiece material in the shape of the electrodes with supports of workpiece material;
   bonding together in a superposed relation, as determined by the locating holes, a plurality of etched workpieces; and removing the supporting workpiece material.

2. A method according to claim 1 wherein the coating step comprises:
 coating the said workpieces in areas determined by the locating holes with etch resistant material in the shape of the electrodes and with etch resistant material along at least part of an edge of each of said workpieces in the shape of a support for the electrodes.

References Cited
UNITED STATES PATENTS

| | | | |
|---|---|---|---|
| 3,118,016 | 1/1964 | Stephenson | 174—68.5 |
| 3,270,399 | 9/1966 | Ohntrup | 317—101 XR |
| 3,235,942 | 2/1966 | Howell et al. | 174—68.5 X |
| 3,264,152 | 8/1966 | Haydon | 174—68.5 X |

DARRELL L. CLAY, *Primary Examiner.*